(12) United States Patent
Chiang et al.

(10) Patent No.: US 11,033,949 B2
(45) Date of Patent: Jun. 15, 2021

(54) METHOD OF MANUFACTURING A HEAT DISSIPATION UNIT

(71) Applicant: ASIA VITAL COMPONENTS CO., LTD., New Taipei (TW)

(72) Inventors: Kuei-Feng Chiang, New Taipei (TW); Chih-Yeh Lin, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 130 days.

(21) Appl. No.: 15/793,003

(22) Filed: Oct. 25, 2017

(65) Prior Publication Data

US 2018/0361460 A1  Dec. 20, 2018

Related U.S. Application Data

(63) Continuation-in-part of application No. 15/627,407, filed on Jun. 19, 2017.

(51) Int. Cl.
| | |
|---|---|
| *B21D 53/04* | (2006.01) |
| *B23K 20/02* | (2006.01) |
| *F28F 21/08* | (2006.01) |
| *F28D 15/02* | (2006.01) |
| *B23K 26/20* | (2014.01) |
| *B23K 101/18* | (2006.01) |

(Continued)

(52) U.S. Cl.
CPC .............. *B21D 53/04* (2013.01); *B23K 20/02* (2013.01); *B23K 26/206* (2013.01); *F28D 15/0233* (2013.01); *F28F 3/022* (2013.01); *F28F 21/086* (2013.01); *F28F 21/089* (2013.01); *B23K 2101/18* (2018.08); *B23K 2101/34* (2018.08); *F28F 2245/02* (2013.01); *F28F 2245/04* (2013.01)

(58) Field of Classification Search
None
See application file for complete search history.

(56) References Cited

U.S. PATENT DOCUMENTS

| | | | | |
|---|---|---|---|---|
| 4,557,413 A | * | 12/1985 | Lewis | B23K 20/00 228/183 |
| 2006/0098411 A1 | * | 5/2006 | Lee | F28D 15/0233 361/704 |

(Continued)

OTHER PUBLICATIONS

Wes Womack, Titanium—Welding and Heat Treating, 2002, AZO Materials (Year: 2002).*

(Continued)

*Primary Examiner* — Anthony J Zimmer
*Assistant Examiner* — Michael J Kachmarik
(74) *Attorney, Agent, or Firm* — Demian K. Jackson; Jackson IPG PLLC

(57) ABSTRACT

A manufacturing method of heat dissipation unit is disclosed. The heat dissipation unit is mainly composed of two titanium metal plate bodies. The titanium metal plate bodies are heat-treated, whereby the titanium metal plate bodies can be mechanical processed, shaped and surface-modified. Accordingly, the titanium metal can be freely shaped and provide capillary attraction. In this case, the titanium metal plate bodies can be used as the material of the heat dissipation unit instead of the conventional copper plate bodies to greatly reduce the weight and enhance the heat dissipation performance.

20 Claims, 8 Drawing Sheets

(51) Int. Cl.
*B23K 101/34* (2006.01)
*F28F 3/02* (2006.01)

(56) References Cited

U.S. PATENT DOCUMENTS

| | | | | |
|---|---|---|---|---|
| 2007/0294892 A1* | 12/2007 | Yang | ................ | B23P 15/26 29/890.032 |
| 2008/0087456 A1* | 4/2008 | Schuette | ............. | H05K 1/0207 174/252 |
| 2011/0146955 A1* | 6/2011 | Chen | ................ | B22F 7/08 165/104.26 |
| 2011/0155355 A1* | 6/2011 | Chen | ................ | B82Y 30/00 165/133 |
| 2014/0174704 A1* | 6/2014 | Lin | ................ | F28D 15/0233 165/185 |
| 2014/0238645 A1* | 8/2014 | Enright | ............. | F28D 15/02 165/104.21 |
| 2014/0238646 A1* | 8/2014 | Enright | ............. | F28F 13/187 165/104.21 |
| 2015/0026981 A1* | 1/2015 | Yang | ................ | B23P 15/26 29/890.039 |
| 2015/0368824 A1* | 12/2015 | Lim | ................ | C25D 11/04 205/50 |
| 2017/0067696 A1* | 3/2017 | Chin | ................ | F28D 15/046 |
| 2019/0033006 A1* | 1/2019 | Vanderwees | ........ | F28D 15/0283 |

OTHER PUBLICATIONS

S. Katayama, Introduction: Fundamentals of laser welding, 2013, Woodhead Publishing Limited (Year: 2013).*

Payam Bozorgi, Ultra-Thin Titanium Based Thermal Solution for Electronic Applications, 2014, PiMEMS, Inc. (Year: 2014).*

M. Sigurdson, Y. W. Liu, P. Bozorgi, D. Bothman, and C. D. Meinhart, and NC. MacDonald, "A large Scale Titanium Thermal Ground Plane," International Journal of Heat and Mass Transfer, 2013. (Year: 2013).*

* cited by examiner

```
S1 — preparing a first titanium metal plate body and a second titanium metal plate body and previously washing/cleaning the first and second titanium metal plate bodies;

S2 — heat-treating the first and second titanium metal plate bodies

S3 — pressing the first titanium metal plate body to form multiple raised sections S4 — connecting a metal mesh with one face of the second titanium metal plate body S5 — placing the first and second titanium metal plate bodies into a vacuum environment and filling a working fluid into one face of the second titanium metal plate body with the metal mesh S6 — mating the face of the first titanium metal plate body with the raised sections with the face of the second titanium metal plate body with the metal mesh and sealing the periphery by means of laser welding.
```

Fig. 9

METHOD OF MANUFACTURING A HEAT DISSIPATION UNIT

This application is a continuation-in-part of U.S. patent application Ser. No. 15/627,407 filed on Jun. 19, 2017.

BACKGROUND OF THE INVENTION

1. Field of the Invention

The present invention relates generally to a manufacturing method of heat dissipation unit, and more particularly to a manufacturing method of heat dissipation unit, in which titanium metal is used as the material of the heat dissipation unit instead of copper.

2. Description of the Related Art

The calculation speed of the current electronic equipments has become faster and faster. As a result, the internal electronic components of the electronic equipments will generate high heat in operation. With respect to the heat dissipation problem of the electronic components, at least one heat dissipation unit is in direct contact or connection with the electronic components to conduct the heat, such as a heat pipe, heat plate, vapor chamber and heat sink. Furthermore, a cooling fan can be connected with the heat dissipation unit to forcedly dissipate the heat.

The heat dissipation unit is generally made of aluminum, copper, stainless steel or an alloy of these metal materials. Aluminum, copper and stainless steel material are able to quickly conduct and dissipate the heat.

Especially, copper is most often used as the material of the heat conduction device. Copper has the advantage of quick heat conduction. However, copper has some shortcomings. That is, after high-temperature reduction process, the crystalline grains of copper (Cu) will grow to coarsen the copper material. This will greatly lower the yield strength. In addition, copper has heavy mass and low hardness so that copper is apt deform. After deformed, copper cannot self-restore to its original state.

In addition, all the current intelligent handheld devices (such as mobile phones, tablets or notebooks), wearable devices and slimmed electronic devices necessitate slimmer passive heat dissipation unit for dissipating the heat. Therefore, the copper plate body of the slimmed electronic device must be replaced with copper foil to meet the requirement of slimming. However, the copper foil structure is softer and lacks sufficient supporting strength. As a result, the copper foil cannot be applied to many specific fields. Moreover, the copper foil is too soft to have any supporting force. Therefore, the copper foil is subject to deformation of external force to damage the internal heat conduction structure.

In addition, the heat dissipation unit made of aluminum, copper or stainless steel material cannot be used in some special environments or severe weather (such as corrosive, high-humidity, highly salty, bitter cold, high temperature, vacuum and outer space environment). Therefore, some manufacturers employs titanium alloy as the material of the heat dissipation unit instead of copper material. Titanium alloy has the properties of high hardness, high anti-corrosion ability, anti-high-temperature, anti-bitter-cold and lightweight. However, it is extremely hard to process titanium alloy. The titanium alloy can be hardly shaped or deformed by any means except cutting, milling and some nontraditional processing manners. Therefore, it is still impossible to fully replace copper material with titanium alloy.

SUMMARY OF THE INVENTION

It is therefore a primary object of the present invention to provide a manufacturing method of heat dissipation unit, in which commercial pure titanium is shaped and processed and manufactured into heat dissipation unit instead of copper material.

To achieve the above and other objects, the manufacturing method of heat dissipation unit of the present invention includes steps of:

S1. preparing a first titanium metal plate body and a second titanium metal plate body and previously washing/cleaning the first and second titanium metal plate bodies;

S2. heat-treating the first and second titanium metal plate bodies;

S3. pressing the first titanium metal plate body to form multiple raised sections;

S4. connecting a metal mesh with one face of the second titanium metal plate body;

S5. placing the first and second titanium metal plate bodies into a vacuum environment and filling a working fluid into one face of the second titanium metal plate body with the metal mesh; and S6. mating the face of the first titanium metal plate body with the raised sections with the face of the second titanium metal plate body with the metal mesh and sealing the periphery by means of laser welding.

The manufacturing method of heat dissipation unit of the present invention improves the shortcoming of the conventional device that it is impossible to shape and process pure titanium. In addition, the manufacturing method of heat dissipation unit of the present invention provides an extremely slim and flexible heat dissipation unit with sufficient strength.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 9 is a flow chart of a first embodiment of the manufacturing method of heat dissipation unit of the present invention.

DETAILED DESCRIPTION OF THE PREFERRED EMBODIMENTS

Figure 1:
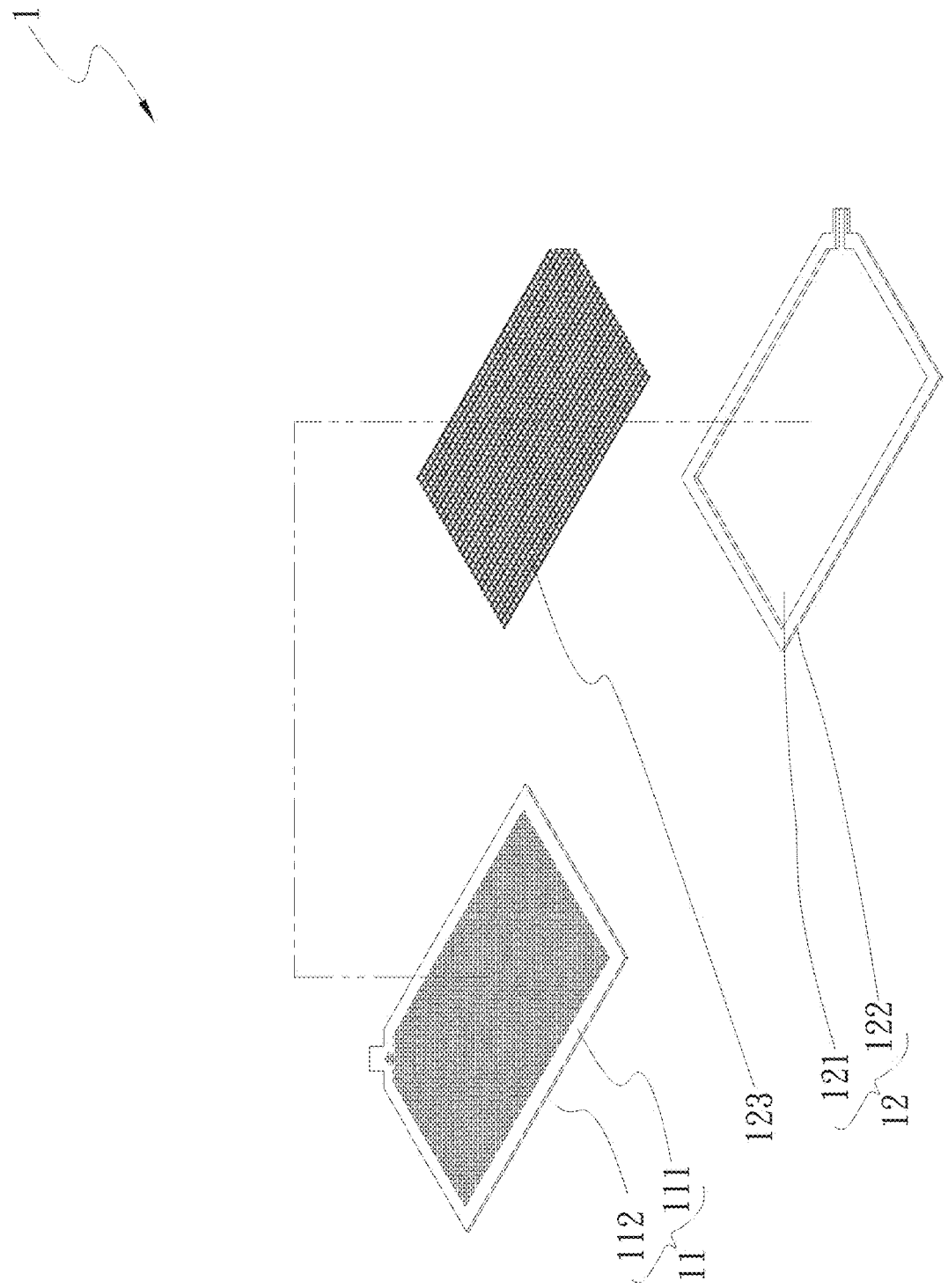
FIG. 1 is a perspective exploded view of a first embodiment of the heat dissipation unit of the present invention.
Figure 2:
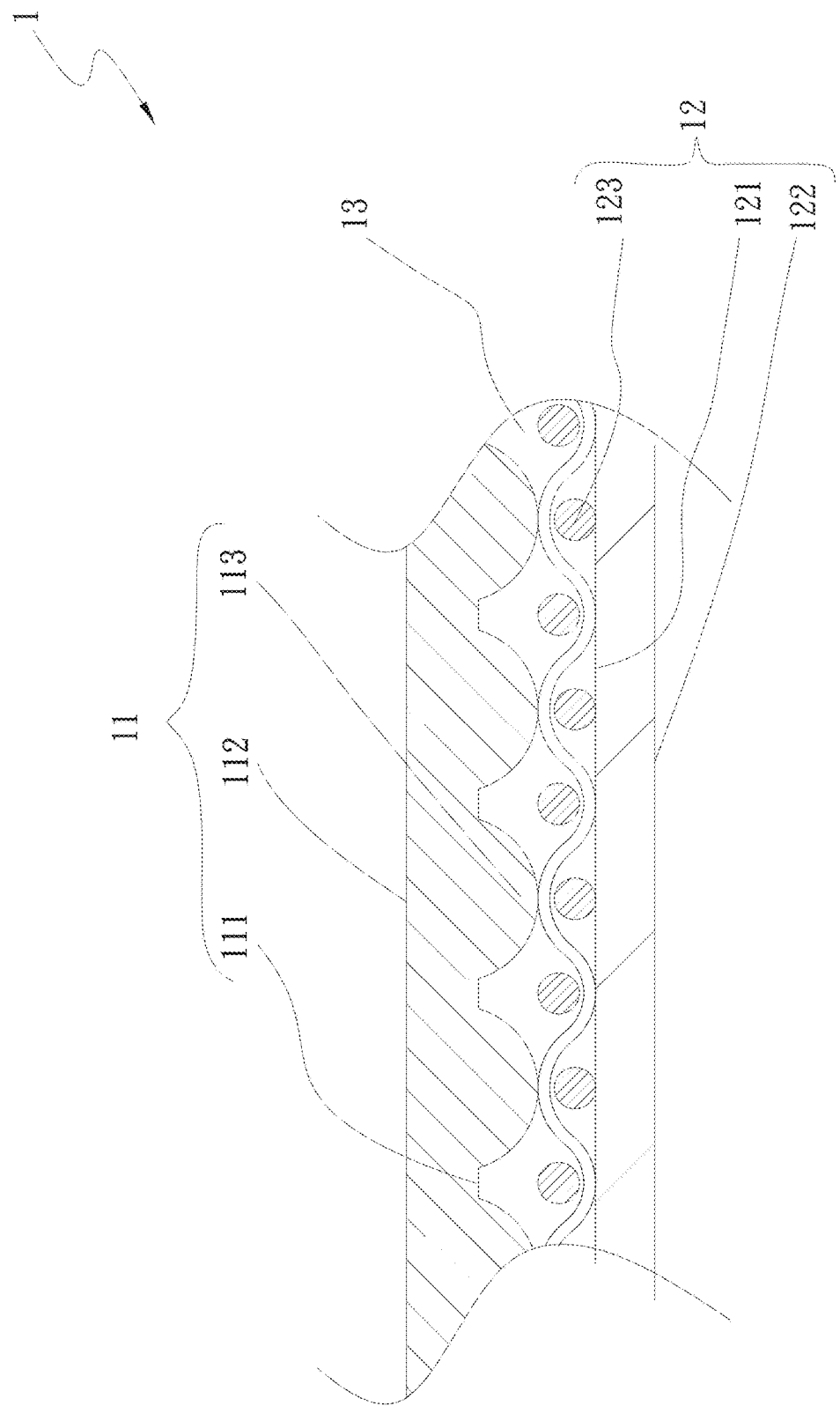
FIG. 2 is a sectional assembled view of the first embodiment of the heat dissipation unit of the present invention.

Please refer to FIGS. 1 and 2. FIG. 1 is a perspective exploded view of a first embodiment of the heat dissipation unit of the present invention. FIG. 2 is a sectional assembled view of the first embodiment of the heat dissipation unit of the present invention. According to the first embodiment, the heat dissipation unit 1 of the present invention includes a first titanium metal plate body 11 and a second titanium metal plate body 12.

The first titanium metal plate body 11 has a first plane face 111 and a second plane face 112. The first plane face 111 has multiple raised sections 113. The raised sections 113 are formed by means of pressing process. The second plane face 112 is a condensation side.

The second titanium metal plate body 12 has a third plane face 121 and a fourth plane face 122. A metal mesh 123 is disposed on the third plane face 121 (as shown in FIG. 2). The first and second titanium metal plate bodies 11, 12 are correspondingly mated with each other to together define a closed chamber 13. A working fluid (not shown) is filled in the closed chamber 13. The fourth plane face 122 is a heat absorption side.

Figure 3:
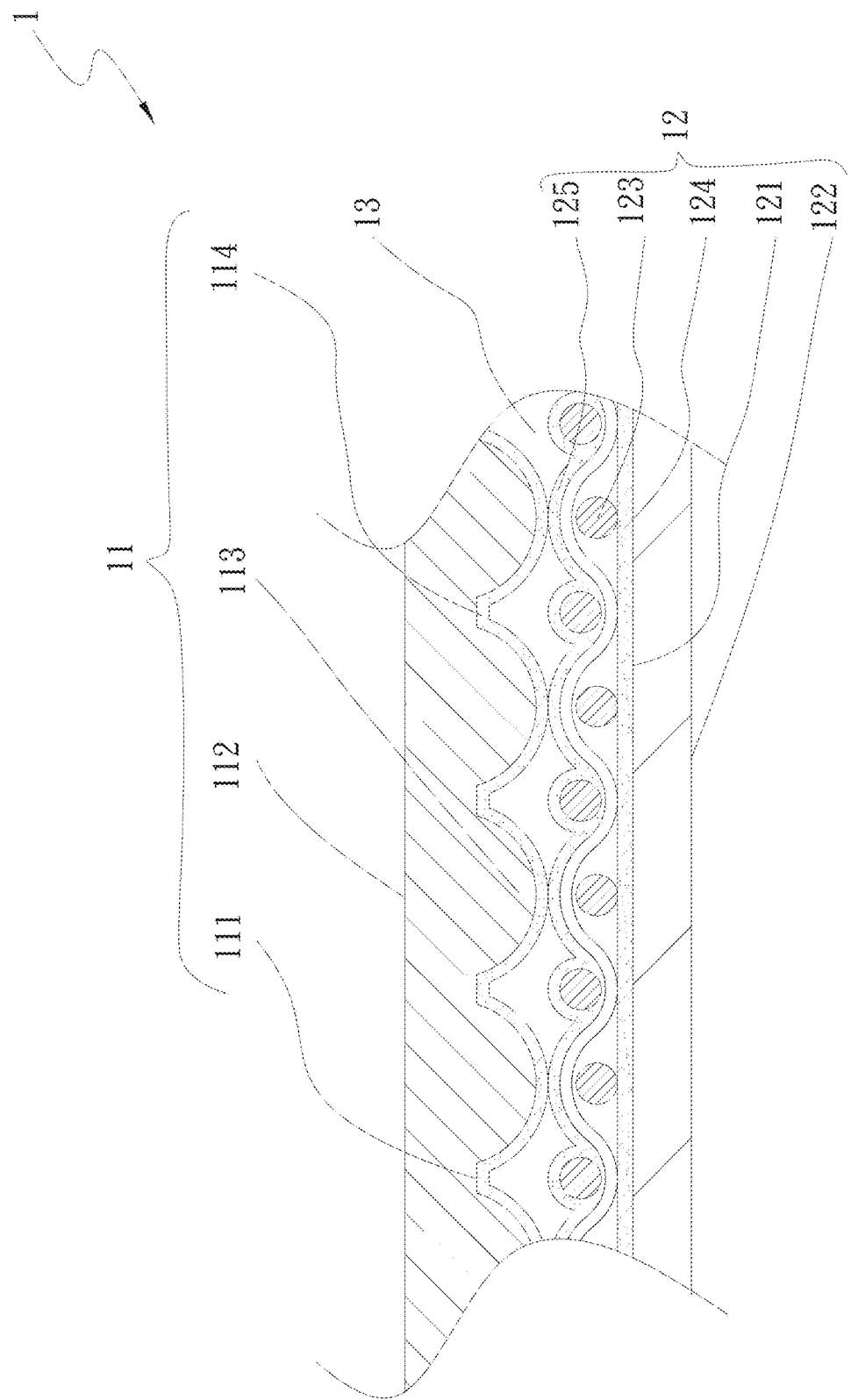
FIG. 3 is a sectional assembled view of a second embodiment of the heat dissipation unit of the present invention.

Please now refer to FIG. 3, which is a sectional assembled view of a second embodiment of the heat dissipation unit of the present invention. The second embodiment is partially identical to the first embodiment in structure and technical characteristic and thus will not be redundantly described hereinafter. The second embodiment is different from the first embodiment in that the surface of the raised sections 113 has a first coating 114. In addition, a second coating 124 is disposed between the metal mesh 123 and the third plane face 121. The surface of the metal mesh 123 has a third coating 125. The first, second and third coatings 114, 124, 125 are hydrophilic or hydrophobic coatings. The hydrophilic coatings are titanium dioxide or silicon dioxide coatings (as shown in FIGS. 5, 6, 7 and 8).

The first, second and third coatings 114, 124, 125 are selectively hydrophilic or hydrophobic coatings. It depends on the sections where the coatings are positioned and the usages of the coatings. For example, the first coating 114 of the first plane face 111 can be selectively a hydrophilic coating or a hydrophobic coating. The second coating 124 on the third plane face 121 is selectively a hydrophilic coating for increasing the water absorptivity and enhancing the connection force between the third plane face 121 and the metal mesh 123. The third coating 125 on the metal mesh 123 is selectively a hydrophilic coating for increasing the moisture content and enhancing the liquid backflow effect.

The first and second titanium metal plate bodies 11, 12 are selectively commercial pure titanium. Before shaped and processed, the first and second titanium metal plate bodies 11, 12 are previously heat-treated.

Figure 4:
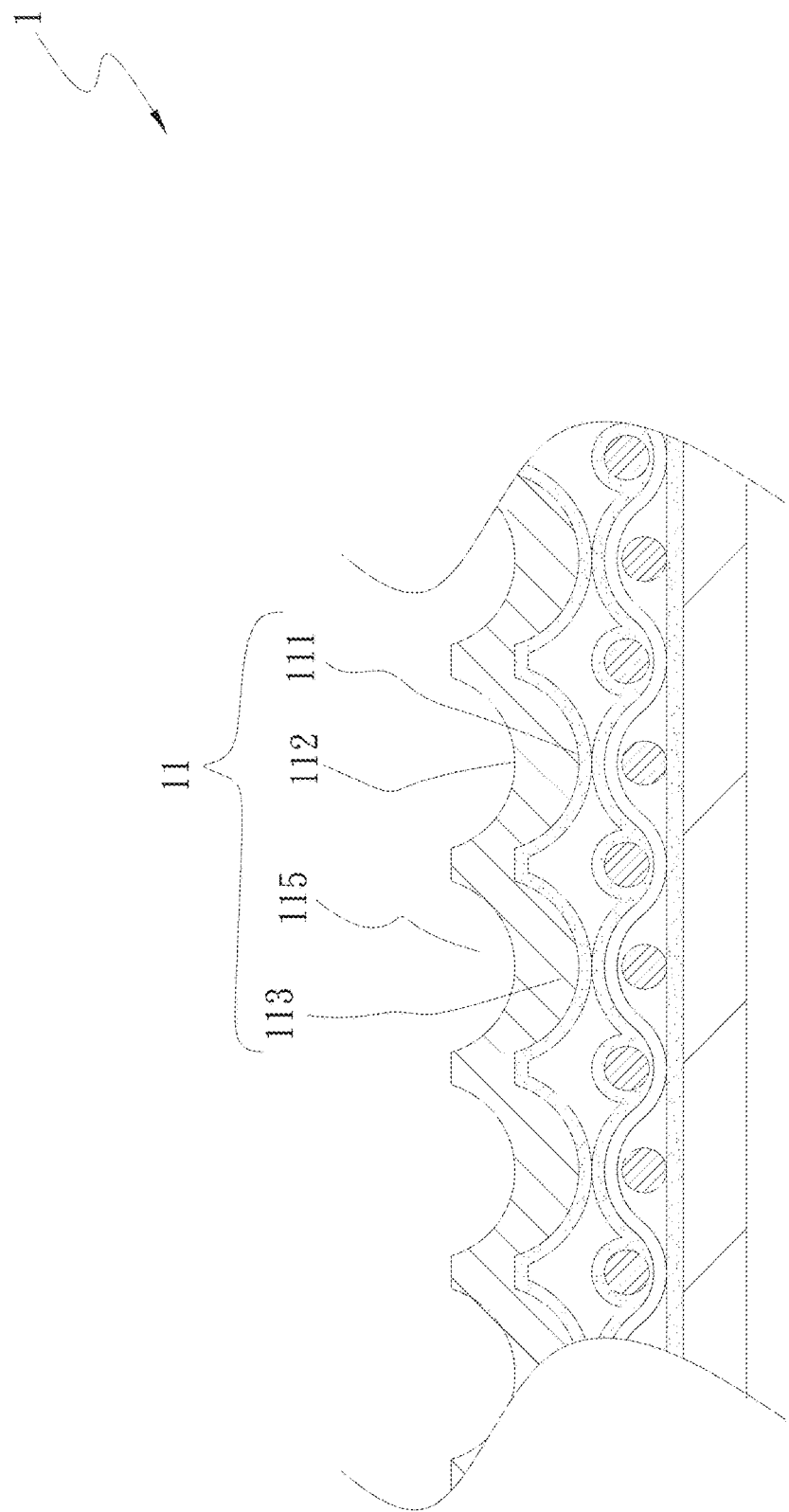
FIG. 4 is a sectional assembled view of a third embodiment of the heat dissipation unit of the present invention.
Figure 5:
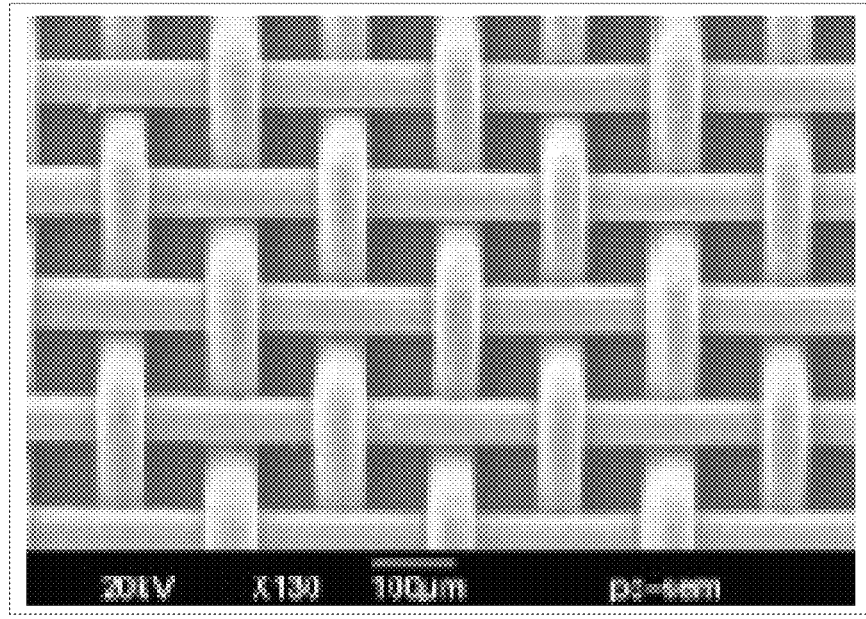
FIG. 5 is an electron microscope photo of the metal meshes of the heat dissipation unit of the present invention.
Figure 6:
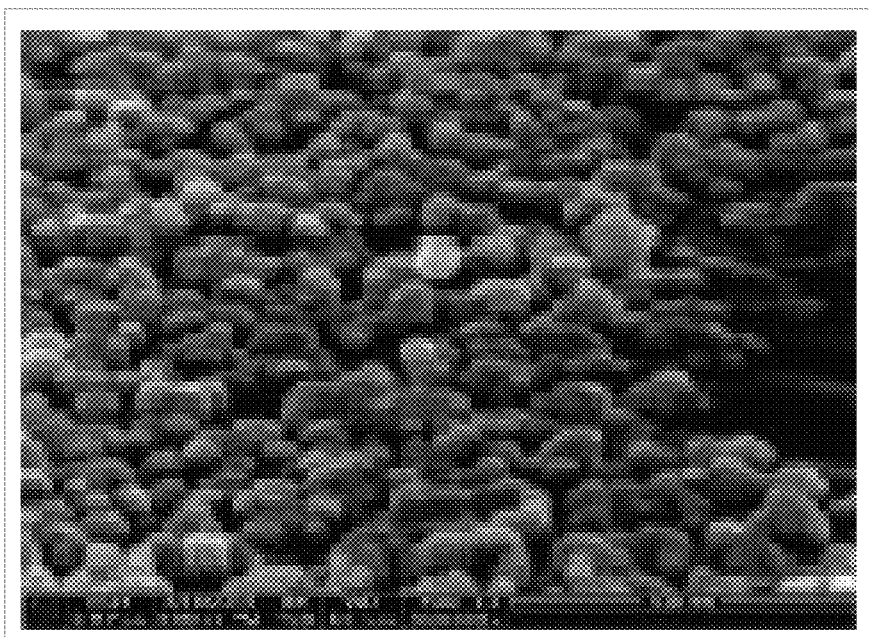
FIG. 6 is an electron microscope photo of the first, second and third coatings of the heat dissipation unit of the present invention.
Figure 7:
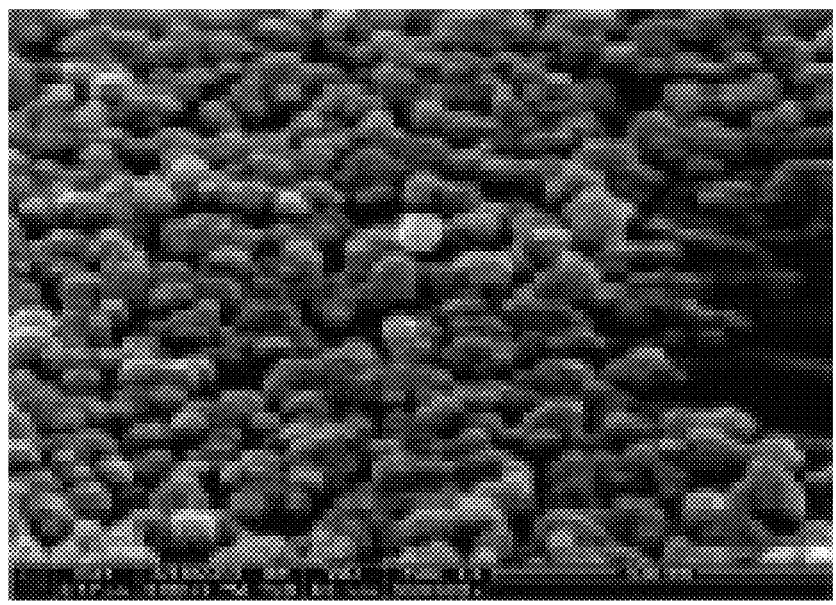
FIG. 7 is an electron microscope photo of the first, second and third coatings of the heat dissipation unit of the present invention.
Figure 8:
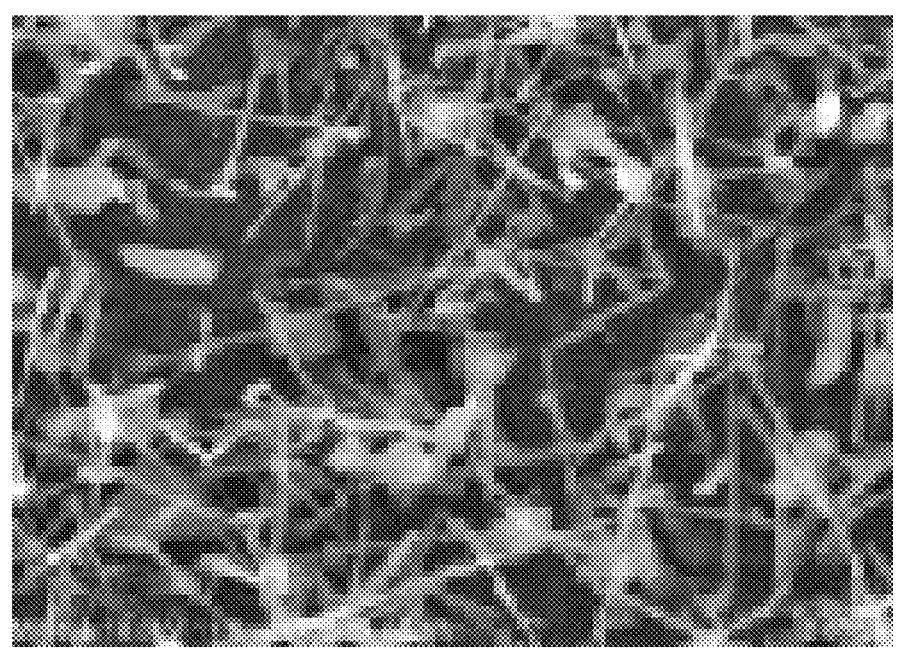
FIG. 8 is an electron microscope photo of the first, second and third coatings of the heat dissipation unit of the present invention.

Please now refer to FIG. 4, which is a sectional assembled view of a third embodiment of the heat dissipation unit of the present invention. The second embodiment is partially identical to the first embodiment in structure and technical characteristic and thus will not be redundantly described hereinafter. The third embodiment is different from the first embodiment in that the second plane face 112 of the first titanium metal plate body 11 is formed with recessed sections 115 in a position opposite to the position of the raised sections 113 of the first plane face 111. Such structure is formed by means of embossing.

Please now refer to FIG. 9, which is a flow chart of a first embodiment of the manufacturing method of heat dissipation unit of the present invention. Please also supplementally refer to FIGS. 1, 2, 3, 4, 5, 6, 7 and 8. According to the first embodiment, the manufacturing method of heat dissipation unit of the present invention includes steps of:

S1. preparing a first titanium metal plate body and a second titanium metal plate body and previously washing/cleaning the first and second titanium metal plate bodies, the first and second titanium metal plate bodies 11, 12 to be processed being previously washed and cleaned in such a manner that the first and second titanium metal plate bodies 11, 12 are first wiped with acetone and then deionized water is added into an ultrasonic washing machine to wash the first and second titanium metal plate bodies 11, 12 and finally, the surfaces of the first and second titanium metal plate bodies 11, 12 are dried by nitrogen, the first and second titanium metal plate bodies 11, 12 being selectively a sort of commercial pure titanium, not common titanium alloy, the pure titanium having the advantage of higher specific strength (tensile strength/density), the pure titanium having a tensile strength better than that of copper, also, the density (4.54 g/cm$^3$) of pure titanium (Ti) being about ½ the density (8.96 g/cm$^3$) of copper (Cu), therefore, in condition of equal volume, the pure titanium (Ti) having higher specific strength to provide higher strength and lighter weight, at normal temperature, the surface of pure titanium being formed with an oxide film ($TiO_2$, $Ti_2O_3$, TiO) with a thickness of hundreds of Å=$10^{-10}$ meter, high stability and strong adhesion, the oxide film being immediately reproducible after damaged, this means that titanium being a sort of metal, which highly tends to be passivated, therefore, the anticorrosion ability of titanium being much better than copper (Cu), this is beneficial to application of vapor chamber in various environments, titanium having excellent anticorrosion ability in all environments including humid environment, seawater environment, chloric solution environment, hypochlorite environment, nitric acid environment, chromic acid environment and common oxidized acid environment;

S2. heat-treating the first and second titanium metal plate bodies, the first and second titanium metal plate bodies 11, 12 being placed into an atmosphere furnace (not shown), in addition, the atmosphere furnace being filled with argon and heated to 400° C.~700° C. for 30~90 minutes mainly for making the first and second titanium metal plate bodies 11, 12 shapeable and processable;

S3. pressing the first titanium metal plate body to form multiple raised sections, one face of the first titanium metal plate body 11 being formed with multiple raised sections 113 by means of mechanical processing such as pressing, the raised sections 113 having the effect of condensation of the working fluid and serving as a supporting structure body;

S4. connecting a metal mesh with one face of the second titanium metal plate body, a metal mesh 123 being connected with the third plane face 121 of the second titanium metal plate body 12 by means of diffusion bonding, the diffusion bonding temperature of the second titanium metal plate body 12 (pure titanium vapor chamber (Ti-VC)) and the metal mesh 123 ranging from 650° C. to 850° C., the manufacturing process atmosphere being positive pressure highly pure argon (Ar) or high vacuum environment ($10^{-4}$~$10^{-6}$ torr), the manufacturing process pressure ranging from 1 kg to 5 kg, the manufacturing process time ranging from 30 min to 90 min, pure titanium being a metal with highly active chemical property, a phase transformation of pure titanium taking place at 883° C. (phase transformation temperature), pure titanium being in β phase at a temperature over 883° C. and having a body-centered cubic (BCC) crystal structure, pure titanium being in α phase at a temperature below 883° C. and having a hexagonal close packing (HCP) crystal structure, in a high-temperature environment, pure titanium being able to react with many elements and compounds and having material phase change, for example, in the air, titanium starting to absorb hydrogen at 250° C. and absorb oxygen at 500° C. and absorb nitrogen at 600° C., along with the rise of temperature, the gas absorption ability of titanium becoming stronger and stronger and hydrogen (H), oxygen (O), carbon (C), nitrogen (N) reacting with titanium to form gaps fixedly resolved in the material to change the mechanical properties or even cause defects to form relevant compounds such as $TiO_2$, TiC, TiN, and $TiH_2$, this resulting in ill affection (fragileness) of the material property, therefore, the manufacturing process temperature and atmosphere (environment control) being critical to relevant thermal manufacturing process of titanium vapor chamber, with respect to the conventional copper vapor chamber (Cu-VC), the diffusion bonding temperature of the metal mesh ranging from 750° C. to 950° C., the manufacturing process atmosphere being 15% $H_2$+85% $N_2$, the manufacturing process pressure ranging from 1 kg to 5 kg, the manufacturing process time ranging from 40 min to 60 min, in high-temperature manufacturing process, the copper vapor chamber being free from the phase transformation as titanium, however, the crystalline grains being apt to grow and coarsen due to heating to greatly deteriorate (soften) the mechanical property;

S5. placing the first and second titanium metal plate bodies into a vacuum environment and filling a working fluid into one face of the second titanium metal plate body with the metal mesh, in this step, the first and second titanium metal plate bodies being disposed in a vacuum environment of $10^{-2}$ torr, a working fluid being filled into one face of the second titanium metal plate body with the metal mesh, whereby the metal mesh on the second titanium metal plate body can fully absorb the working fluid; and S6. mating the face of the first titanium metal plate body with the raised sections with the face of the second titanium metal plate body with the metal mesh and sealing the periphery by means of laser welding, the first plane face 111 of the first titanium metal plate body 11 (with the raised sections 113) being mated with the third plane face 121 of the second titanium metal plate body 12 (with the metal mesh 123) and the periphery of the first and second titanium metal plate bodies 11, 12 being sealed by means of laser welding.

The sealing process is performed with laser welding technique. The laser energizing source is disk solid ytterbium yttrium aluminum garnet (Yb:YAG). The laser wavelength is 1030 nm. The laser power ranges from 100 to 500 W (depending on the thickness of the material). The sealing process is performed in a vacuum environment of $10^{-2}$ torr.

The laser welding has the advantages of energy concentration (performable in a small region without affecting the adjacent material), short working time (uneasy to change the mechanical property of the entire component), ultra-clean fusion (without any welding material) and speeded automated production.

Figure 10:
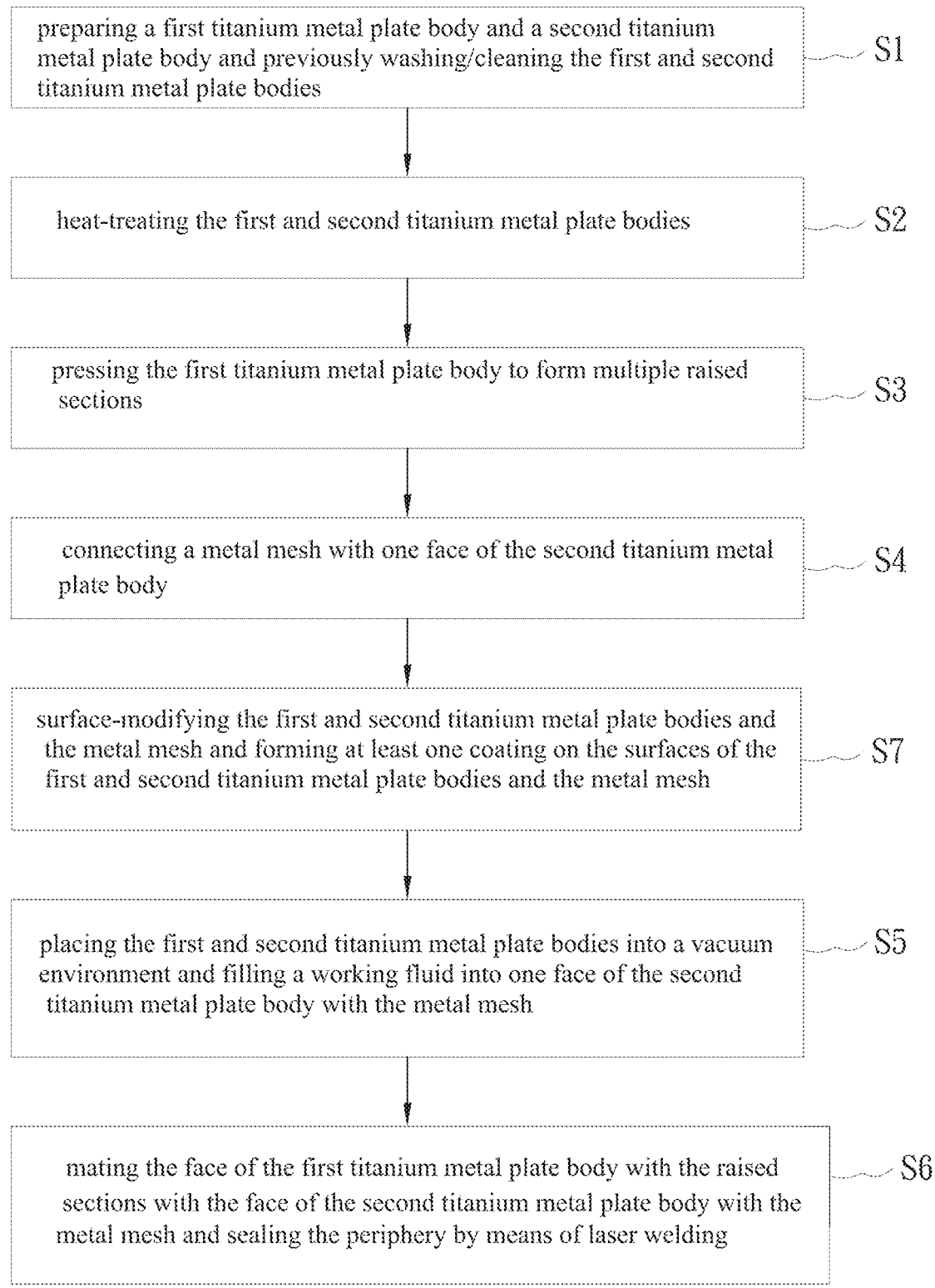
FIG. 10 is a flow chart of a second embodiment of the manufacturing method of heat dissipation unit of the present invention.

Please now refer to FIG. 10, which is a flow chart of a second embodiment of the manufacturing method of heat dissipation unit of the present invention. Please also supplementally refer to FIGS. 1, 2, 3, 4, 5, 6, 7 and 8. According to the second embodiment, the manufacturing method of heat dissipation unit of the present invention includes steps of:

S1. preparing a first titanium metal plate body and a second titanium metal plate body and previously washing/cleaning the first and second titanium metal plate bodies;

S2. heat-treating the first and second titanium metal plate bodies;

S3. pressing the first titanium metal plate body to form multiple raised sections;

S4. connecting a metal mesh with one face of the second titanium metal plate body;

S5. placing the first and second titanium metal plate bodies into a vacuum environment and filling a working fluid into one face of the second titanium metal plate body with the metal mesh; and S6. mating the face of the first titanium metal plate body with the raised sections with the face of the second titanium metal plate body with the metal mesh and sealing the periphery by means of laser welding.

The second embodiment is partially identical to the first embodiment in step and thus will not be redundantly described hereinafter. The second embodiment is different from the first embodiment in that the second embodiment further includes a step S7 after step S4 of connecting a metal mesh with one face of the second titanium metal plate body. Step S7 is surface-modifying the first and second titanium metal plate bodies and the metal mesh and forming at least one coating on the surfaces of the first and second titanium metal plate bodies and the metal mesh. The surface-modification of the first and second titanium metal plate bodies can be performed in any of four manners as follows:

1. The first and second titanium metal plate bodies 11, 12 are placed into an atmosphere furnace (not shown). The atmosphere furnace is vacuumed and heated to 400° C.~700° C. for 30~90 minutes. The manufacturing process atmosphere is positive pressure pure argon (Ar), whereby overheating reduction takes place on the surfaces of the first and second titanium metal plate bodies 11, 12. In this manufacturing process, the microscale oxygen in the manufacturing process atmosphere is controlled to produce micro anatase and $TiO_2$ nano-rods on the surface of the titanium material. This structure has excellent hydrophily and long timeliness (1~2 weeks). However, along with the time and the affection of the environment (humidity), the hydrophily will be weakened. At this time, UV ray can be radiated onto the product to recover the hydrophily due to photocatalysis. The radiation time is about 20 min~60 min (depending on the intensity of the UV ray).

2. The first and second titanium metal plate bodies 11, 12 are placed into an atmosphere furnace. The atmosphere furnace is vacuumed and heated to 400° C.~700° C. for 30~90 minutes, whereby overheating reduction takes place on the surfaces of the first and second titanium metal plate bodies 11, 12. In this manufacturing process, the microscale oxygen in the manufacturing process atmosphere is controlled to produce micro anatase and $TiO_2$ nano-rods on the surface of the titanium material. This structure has excellent hydrophily and long timeliness (1~2 weeks). However, along with the time and the affection of the environment (humidity), the hydrophily will be weakened. At this time, UV ray can be radiated onto the product to recover the hydrophily due to photocatalysis. The radiation time is about 20 min~60 min (depending on the intensity of the UV ray).

3. Sol-gel coating. This is mainly performed on the metal mesh 123 of the surface of the second titanium metal plate body 12. First, a layer of crystallized silicon dioxide ($SiO_2$) is coated as a substrate layer. After baked and dried with an 80° C. roaster, a layer of anatase-type titanium ($TiO_2$) is further coated. Then, a $SiO_2/TiO_2$ complex film is formed by means of fully dense sintering treatment. The fully dense sintering temperature ranges from 400° C. to 700° C. and the sintering time ranges from 30 min to 90 min. The manufacturing process atmosphere is positive pressure pure argon (Ar). The $SiO_2/TiO_2$ complex film has excellent hydrophily and long timeliness (1~2 weeks). However, along with the time and the affection of the environment (humidity), the hydrophily will be weakened. At this time, UV ray can be radiated onto the product to recover the hydrophily due to photocatalysis on the surface of the $SiO_2/TiO_2$ complex film. The radiation time is about 20 min~60 min (depending on the intensity of the UV ray).

4. Sol-gel coating. This is mainly performed on the metal mesh 123 of the surface of the second titanium metal plate body 12. First, a layer of crystallized silicon dioxide ($SiO_2$) is coated as a substrate layer. After baked and dried with an 80° C. roaster, a layer of anatase-type titanium ($TiO_2$) is further coated. Then, a $SiO_2/TiO_2$ complex film is formed by means of fully dense sintering treatment. The fully dense sintering temperature ranges from 400° C. to 700° C. and the sintering time ranges from 30 min to 90 min. The manufacturing process environment is vacuumed. The $SiO_2/TiO_2$ complex film has excellent hydrophily and long timeliness (1~2 weeks). However, along with the time and the affection of the environment (humidity), the hydrophily will be weakened. At this time, UV ray can be radiated onto the product to recover the hydrophily due to photocatalysis on the surface of the $SiO_2/TiO_2$ complex film. The radiation time is about 20 min~60 min (depending on the intensity of the UV ray)

The metal mesh can be made of titanium, stainless steel, copper, aluminum or any other suitable metal material, or the two metal meshes are respectively made of titanium and stainless steel and superposed and connected to the first titanium metal sheet and the second titanium metal sheet, respectively.

The present invention mainly provides commercial pure titanium as a substrate material instead of copper-made heat dissipation unit such as vapor chamber. The present invention also provides a manufacturing process in which the pure titanium is processed instead of copper. The pure titanium has many advantages over the shortcomings of copper material. In the present invention, pure titanium is used as the material of the heat dissipation unit instead of copper, aluminum, stainless steel, etc. Moreover, pure titanium is lightweight and has the properties of high strength and anticorrosion ability so that the carrier base seat or carrier middle frame of a handheld device or a mobile device can be made of pure titanium. Also, the carrier structure and the heat dissipation structure can be directly integrated. This meets the requirement for slimmed structure of the current mobile device or handheld device and can provide both supporting effect and heat dissipation effect.

The slim pure titanium material is a sort of memory metal, which can be bent and deformed by external force. After the external force disappears, the slim pure titanium material can restore to its original state. Therefore, the slim pure titanium material can be also directly integrated with an intelligent watch or directly made into a watch belt. In this case, the slim pure titanium material can provide both heat dissipation effect and supporting effect and can be worn on the hand.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A manufacturing method of a heat dissipation unit comprising steps of:
    providing a first and second titanium metal plate body;
    preparing the first and second titanium metal plate bodies by washing/cleaning;
    heat-treating the first and second titanium metal plate bodies;
    pressing a first face of the first titanium metal plate body to form multiple raised sections;
    embossing an opposite, second face of the first titanium metal plate body to form multiple recessed sections;
    connecting a first titanium metal mesh piece with one face of the first titanium metal plate body and connecting a second stainless steel mesh piece with one face of the second titanium metal plate body;
    placing the first and second titanium metal plate bodies and metal mesh pieces into a vacuum environment and filling a working fluid into one face of the second titanium metal plate body with the second stainless steel metal mesh piece;
    and mating the face of the first titanium metal plate body with the raised sections with the face of the second titanium metal plate body with the first titanium metal mesh piece and the second stainless steel mesh piece superposed and sealing the periphery by laser welding.

2. The manufacturing method of claim 1, wherein the first and second titanium metal plate bodies are washed/cleaned in such a manner that the first and second titanium metal plate bodies are first wiped with acetone and then deionized water is added into an ultrasonic washing machine to wash the first and second titanium metal plate bodies and finally, the surfaces of the first and second titanium metal plate bodies are dried by nitrogen.

3. The manufacturing method of claim 1, wherein the first and second titanium metal plate bodies are heat-treated in such a manner that the first and second titanium metal plate bodies are placed into an atmosphere furnace and the atmosphere furnace is filled with argon and heated to 400° C.~700° C. for 30~90 minutes.

4. The manufacturing method of claim 1, further comprising a step of surface-modifying the first and second titanium metal plate bodies, the first titanium metal mesh piece, and the second stainless steel mesh piece and forming at least one coating on the surfaces of the first and second titanium metal plate bodies, the first titanium metal mesh piece, and the second stainless steel mesh piece.

5. The manufacturing method of claim 4, wherein the coating is a hydrophilic coating or a hydrophobic coating.

6. The manufacturing method of claim 4, wherein the coating is titanium dioxide or silicon dioxide.

7. The manufacturing method of claim 1, wherein the second stainless steel metal mesh piece is connected with the second titanium metal plate body by diffusion bonding.

8. The manufacturing method of claim 7, wherein the diffusion bonding temperature ranges from 650° C. to 850° C. and the working time ranges from 30 min to 90 min.

9. The manufacturing method of claim 4, wherein the first and second titanium metal plate bodies, the first titanium metal mesh piece, and the second stainless steel mesh piece are surface-modified in such a manner that the first and second titanium metal plate bodies, the first titanium metal mesh piece, and the second stainless steel mesh piece are placed into an atmosphere furnace and the atmosphere furnace is filled with argon and heated, whereby overheating reduction takes place on the surfaces of the first and second titanium metal plate bodies, the first titanium metal mesh piece, and the second stainless steel mesh piece.

10. The manufacturing method of claim 4, wherein the first and second titanium metal plate bodies, the first titanium metal mesh piece, and the second stainless steel mesh piece are surface-modified in such a manner that the first and second titanium metal plate bodies, the first titanium metal mesh piece, and the second stainless steel mesh piece are placed into an atmosphere furnace and the atmosphere furnace is vacuumed and heated, whereby overheating reduction takes place on the surfaces of the first and second titanium metal plate bodies, the first titanium metal mesh piece, and the second stainless steel mesh piece.

11. The manufacturing method of claim 4, wherein the first and second titanium metal plate bodies, the first titanium metal mesh piece, and the second stainless steel mesh piece are surface-modified by a Sol-gel coating, the first and second titanium metal plate bodies, the first titanium metal mesh piece, and the second stainless steel mesh piece are placed into an atmosphere furnace and the atmosphere furnace is vacuumed and heated, whereby a coating is formed on the surfaces of the first and second titanium metal plate bodies, the first titanium metal mesh piece, and the second stainless steel mesh piece.

12. The manufacturing method of claim 11, wherein the coating is titanium dioxide.

13. The manufacturing method of claim 4, wherein the first and second titanium metal plate bodies, the first titanium metal mesh piece, and the second stainless steel mesh piece are surface-modified by a Sol-gel coating, the first and second titanium metal plate bodies, the first titanium metal mesh piece, and the second stainless steel mesh piece are placed into an atmosphere furnace and the atmosphere furnace is filled with argon and heated, whereby a coating is formed on the surfaces of the first and second titanium metal plate bodies, the first titanium metal mesh piece, and the second stainless steel mesh piece.

14. The manufacturing method of claim 1, wherein the first and second titanium metal plate bodies are mated with each other and the periphery of the first and second titanium metal plate bodies is sealed by laser welding, the laser welding wavelength being 1030nm, the laser power ranging from 100 to 500W, the sealing process being performed in a vacuum environment of 10-2 torr.

15. The manufacturing method of claim 9, wherein the atmosphere furnace is heated to 400° C.~700° C. for 30~90 minutes.

16. The manufacturing method of claim 10, wherein the atmosphere furnace is heated to 400° C.~700° C. for 30~90 minutes.

17. The manufacturing method of claim 11, wherein the atmosphere furnace is heated to 400° C.~700° C. for 30~90 minutes.

18. The manufacturing method of claim 13, wherein the atmosphere furnace is heated to 400° C.~700° C. for 30~90 minutes.

19. The manufacturing method of claim 1, wherein the second titanium metal plate is provided with a third planar face and an opposite, fourth planar face.

20. The manufacturing method of claim 1, wherein the multiple raised sections of the first titanium metal plate body are formed on an interior face of the first titanium metal plate body as mated and sealed to the second titanium metal plate body and with the embossed multiple recessed sections formed to be arranged opposite the interior multiple raised sections.

* * * * *